United States Patent
Lu et al.

(10) Patent No.: US 9,419,793 B2
(45) Date of Patent: Aug. 16, 2016

(54) METHOD FOR GENERATING LARGE PRIME NUMBER IN EMBEDDED SYSTEM

(71) Applicant: Feitian Technologies Co., Ltd., Beijing (CN)

(72) Inventors: Zhou Lu, Beijing (CN); Huazhang Yu, Beijing (CN)

(73) Assignee: Feitian Technologies Co., Ltd., Beijing (CN)

( * ) Notice: Subject to any disclaimer, the term of this patent is extended or adjusted under 35 U.S.C. 154(b) by 227 days.

(21) Appl. No.: 14/237,363

(22) PCT Filed: Sep. 25, 2012

(86) PCT No.: PCT/CN2012/081901
§ 371 (c)(1),
(2) Date: Feb. 6, 2014

(87) PCT Pub. No.: WO2013/091416
PCT Pub. Date: Jun. 27, 2013

(65) Prior Publication Data
US 2014/0185799 A1    Jul. 3, 2014

(30) Foreign Application Priority Data
Dec. 23, 2011  (CN) .......................... 2011 1 0439890

(51) Int. Cl.
G06F 7/58  (2006.01)
H04L 9/08  (2006.01)
G06F 7/72  (2006.01)

(52) U.S. Cl.
CPC ................ *H04L 9/0819* (2013.01); *G06F 7/72* (2013.01)

(58) Field of Classification Search
None
See application file for complete search history.

(56) References Cited

U.S. PATENT DOCUMENTS 6,718,536 B2 * 4/2004 Dupaquis .................. G06F 7/72 380/30
7,120,248 B2 * 10/2006 Hopkins ................... G06F 7/72 380/30

(Continued)

FOREIGN PATENT DOCUMENTS

| CN | 102279840 A | 12/2011 |
| CN | 102591618 A | 7/2012 |
| EP | 1465366 A1 | 10/2004 |

*Primary Examiner* — David H Malzahn
(74) *Attorney, Agent, or Firm* — Hammer & Associates, P.C.

(57) ABSTRACT

A method for generating a large prime number in an embedded system, comprising: (1) setting all identifiers in an identifier group in a first storage area; generating and storing a random number with preset bit length in a third storage area; modulizing the data in the third storage area by using the data stored in the storage unit of a second storage area as a modulus; determining the serial number of the identifier to be reset in the identifier group according to the modulized value and the data in the storage unit corresponding to the modulized value; and resetting the identifier corresponding to the serial number; (2) judging whether a set identifier exists in the identifier group, if yes, then executing step (3); otherwise, returning to step (1); and (3), determining a number to be detected according to the random number and the serial number of the set identifier in the identifier group; detecting the primality of the number to be detected; if the number to be detected passes the primality detection, then outputting the number to be detected; and if the numbers to be detected corresponding to all the set identifiers in the identifier group fail to pass the primality detection, then returning to step (1). The present method has high efficiency and is suitable for an embedded system.

5 Claims, 3 Drawing Sheets

(56) References Cited

U.S. PATENT DOCUMENTS

| | | | |
|---|---|---|---|
| 2002/0176573 A1* | 11/2002 | Futa | G06F 7/72 380/44 |
| 2003/0235299 A1 | 12/2003 | Dupaquis | |
| 2013/0182839 A1* | 7/2013 | Vuillaume | G06F 7/582 380/44 |
| 2014/0185799 A1* | 7/2014 | Lu | H04L 9/0819 380/46 |

* cited by examiner

METHOD FOR GENERATING LARGE PRIME NUMBER IN EMBEDDED SYSTEM

TECHNICAL FIELD

The present invention relates to cryptography field, and in particular relates to a method for generating a large prime number in an embedded system.

PRIOR ART

In a password implementation process, especially in process of implementing public key cryptography, an embedded system is required to generate a large prime number for encryption process, etc. to use. For example, key parameters of the RSA encryption process require to use large prime numbers generated by the embedded system.

In the prior art, generating a large prime number includes generating a random number with sufficient length; determining whether the random number is a prime number; if the random number is not a prime number, regenerating a group of new random numbers or transforming the current random number moderately; then determining whether the new random number is a prime number one more time till a random number which meets requirement is generated.

In above process of generating a large prime number, the present inventors have found at least the following shortcomings in the prior art: in process of generating a large prime number, the primality test on a lot of random numbers is required to determine whether a random number is a prime number. Because the primality test needs modular exponentiation which consumes much time and the probability of successful passing the primality test is not high at all; in most cases, a large prime number can only be obtained by searching random numbers for hundreds, even thousands of times, which is not suitably applied in an embedded system.

SUMMARY OF THE INVENTION

The object of the present invention is to provide a method for generating a large prime number in an embedded system, which improves probability of successful passing the primality test so as to improve the efficiency of generating a prime number.

Thus, the present invention provides a method for generating a large prime number in an embedded system, which is used in a system comprising a first storage area and a second storage area, wherein the first storage area stores an identifier group with predetermined size, sequence numbers of the identifiers in the identifier group are consecutive integers including 0 and different identifiers are different in sequence numbers, and the second storage area comprises a plurality of storage units and the different storage units store different prime numbers, said method comprising steps of (1) resetting all identifiers in the identifier group stored in the first storage area; generating a random number with predetermined bit length and storing the random number in a third storage area, taking the data of the storage unit in the second storage area as modulus to perform modulus operation on the data (i.e. modulizing the data) stored in the third storage area to obtain a modulus value (or called modulized value); according to the modulus value and the data stored in the storage unit corresponding to the modulus value, determining sequence number of the identifier which requires to be reset in the identifier group and resetting the identifier corresponding to the sequence number;

(2) determining whether a reset identifier exists in the identifier group, if yes, go to Step (3); if no, go back to Step (1);

(3) determining a number to be tested according to the random number and the sequence number of the reset identifier in the identifier group and performing primality test on the number to be tested; if the number to be tested passes the primality test, outputting the number to be tested as a large prime number; if numbers to be tested corresponding to all the reset identifiers in the identifier group do not pass the primality test, go back to Step (1).

Preferably, according to the modulus value and the data stored in the storage unit corresponding to the modulus value, determining the sequence number of the identifier which requires to be reset in the identifier group specifically comprises when the modulus value is 0, taking sum of the modulus value and integer times of data stored in the storage unit corresponding to the modulus value as the sequence number of the identifier to be reset;

when the modulus value is an odd, obtaining difference of the data stored in the storage unit corresponding to the modulus value and the modulus value, obtaining a result by dividing the difference by 2 and taking the result as the sequence number of the identifier to be reset; and when the modulus value is a non-zero even, obtaining a quotient by dividing the current modulus value by 2 and taking the difference of the current prime number and the quotient as the sequence number of the identifier to be reset; and determining a number to be tested according to the random number and the sequence number of the reset identifier in the identifier group specifically comprises taking result of sum of twice of the sequence number of the reset identifier and the random number as the number to be tested.

Preferably, according to the modulus value and the data stored in the storage unit corresponding to the modulus value, determining the sequence number of the identifier which requires to be reset in the identifier group specifically comprises when the modulus value is 0, taking sum of the modulus value and integer times of the data stored in the storage unit corresponding to the modulus value as the sequence number of the identifier which requires to be reset;

when the modulus value is an odd, obtaining sum of the data stored in the storage unit corresponding to the modulus value and the modulus value, obtaining a quotient by dividing the difference by 2 and taking the quotient as the sequence number of the identifier to be reset; and when the modulus value is a non-zero even, taking a quotient of dividing the modulus value by 2 as the sequence number of the identifier which requires to be reset; and determining a number to be tested according to the random number and the sequence number of the reset identifier in the identifier group specifically comprises taking difference of the random number and twice of the sequence number of the identifier to be reset as the number to be tested.

Preferably, generating the random number with a predetermined bit length comprises generating a binary number with a predetermined bit length;

determining whether the least significant bit (or called the last significant bit) of the binary number is 1, if the least significant bit of the binary number is 1, taking the binary number as the random number; if the least significant bit of the binary number is not 1, setting the least significant bit of the binary number to be 1 and taking the binary number as the random number.

Preferably, generating the random number with predetermined bit length comprises generating a binary number with a predetermined bit length;

determining whether the most significant bit (or called the first significant bit) of the binary number is 1, if the most significant bit of the binary number is 1, taking the binary number as the random number; if the most significant bit of the binary number is not 1, setting the most significant bit of the binary number to be 1 and taking the binary number as the random number.

The advantages of the present invention include providing a method of generating a large prime number in the embedded system, which screens data required to be tested by using a small prime number before a primality test. The method improves probability of passing the primality test so as to improve efficiency of generating large prime numbers.

BRIEF DESCRIPTION OF THE ACCOMPANYING DRAWINGS

DETAILED DESCRIPTION OF THE PRESENT INVENTION

The technical solutions of the embodiments of the disclosure are described in a clear and complete manner in association with the accompanying drawings as follows. Apparently, the described embodiments are merely a part of, rather than, all embodiments of the disclosure. Based on the described embodiments of the disclosure, other embodiments obtained by those skilled in the art without conducting inventive work should fall into the scope of the disclosure.

EMBODIMENT 1

Figure 1:
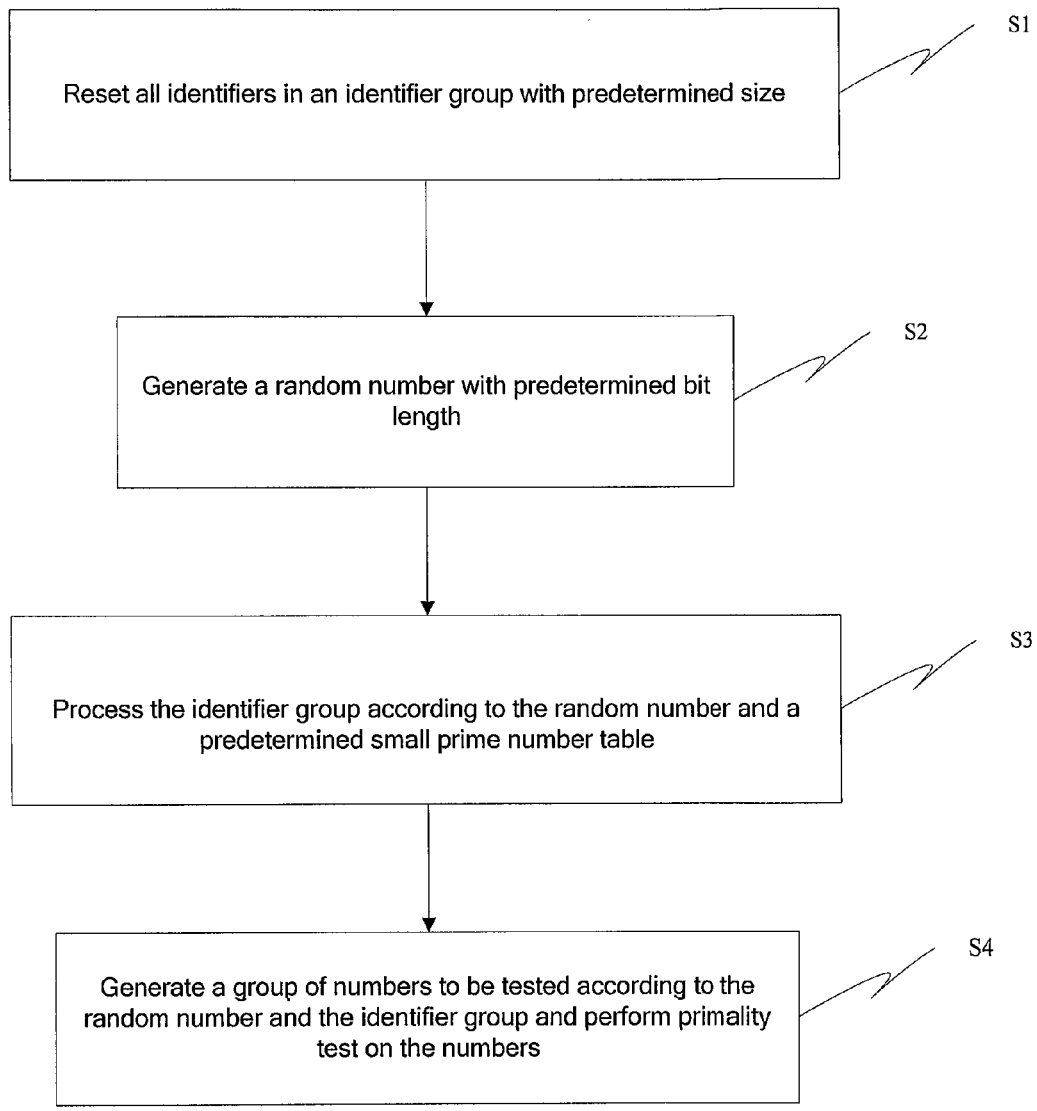
FIG. 1 is a flow chart of a method for generating a large prime number in an embedded system provided by Embodiment 1 of the present invention.

Shown as FIG. 1, in order to improve probability of successful passing the primality test and thus improving the efficiency of generating a large prime, Embodiment 1 provides a method for generating a large prime number in an embedded system, which specifically includes following steps:

Step S1, set all identifiers in an identifier group with a predetermined size;

Specifically, in Embodiment 1, the predetermined size is 768; the identifier group contains 768 identifiers. In addition, the other size can be applied as well. For convenience of description, the identifiers are marked as the $0^{th}$ identifier, the $1^{st}$ identifier, ..., the $766^{th}$ identifier and the $767^{th}$ identifier;

Step S2, generate a random number with a predetermined bit length;

Specifically, in the present embodiment, the predetermined bit length is 1024. In addition, the other bit length can also be applied.

Preferably, in Embodiment 1, Step S2 further includes if the least significant bit (or called the last significant bit) of the generated random number is not 1, set the lowest bit be 1; if the most significant bit of the generated random number is not 1, set the most significant bit to be 1; while, if the second significant bit of the random number is not 1, set the second significant bit to be 1. In this way, it assures that the random number is big enough and is not an even.

Sequences of Step S1 and Step S2 can be reversed.

Step S3, process the identifier group according to the random number and a predetermined small prime number table.

Specifically, in Embodiment 1, the small prime number table contains all small prime numbers between 3 to 255, which includes 3 and 255, e.g. 3, 5, 7, 11, ..., etc. In addition, the other prime number tables can be used as well.

Specifically, Step S3 includes performing following steps on each prime number in the small prime table.

Step S3-1, take a current small prime as modulus and perform modulo operation on the random number to obtain a modulus value;

If the current prime number is n, the category of the modulus value ranged from 0, 1, ..., to n−1. Specifically, if the current prime number is 13, the category of the modulus value ranges from 0, 1, ..., to 12.

If the result of modulus operation is not in the above category, the result plus or minus the integer times of the current small prime number, which makes the result to be in the category.

Step S3-2, compute the identifier numbers to be reset in respective units according to the modulus value;

Specifically, Step S3-2 includes (1) dividing the identifier group in a plurality units according to the current prime number and numbering the identifiers in the units orderly as 0, 1, ..., if the modulus value is 0, numbering the identifier to be reset as 0; otherwise, if the modulus value is an odd, numbering the identifier to be reset as a result obtained by dividing difference of the current prime number and the modulus value by 2; otherwise, the modulus value is an odd, the number of the identifier to be reset is a result of dividing the difference of the current prime number and the modulus value by 2;

For example, if the current prime number is 13, the identifier group is divided into 60 units (i.e. dividing 768 by 13 to obtain a result and round number of the result then plus 1). In this case, 59 units have 13 identifiers respectively; the last unit has 1 identifier; if the modulus value is 5, the number of the identifier to be reset is (13−5)/2=4; if the modulus value is 6, the number of the identifier to be reset is 13−(6/2)=10.

Or (2) if the modulus value is 0, the number of the identifier to be reset is 0 and the integer times of the current prime number; otherwise, if the modulus value is an odd; otherwise, if the modulus value is an odd, the number of the identifier to be reset is the result of dividing the difference of the current prime number and the modulus value by 2 and the sum of the result of the integrate number and integer times of the current prime number; otherwise, the modulus value is an odd; the number of the identifier to be reset is the difference of the current prime number and the result obtained by dividing the modulus value by 2; and the sum of the difference and the integer times of the current prime number.

For example, if the current prime number is 13 and the modulus value is 5, the number of the identifier to be reset is (13−5)/2=4, or sum of 4 and the integer times of the current prime number 13; if the modulus value is 6, the number of the identifier to be reset is 13−(6/2)=10, or sum of 4 and the integer times of the current prime number 13.

Step S3-3, reset corresponding identifier in the identifier group.

If there is no corresponding identifier of the number in the identifier group, skip Step S3-3.

Step S4, generate a group of numbers to be tested according to the random number and the identifier group and perform the primality test.

Specifically, check the identifier group orderly and perform following operation.

Step S4-1, if all of the identifiers are checked completely, the process is ended; otherwise, check whether the current identifier is reset. If yes, calculate sum of twice of the current identifier number and the random number; the sum is the current number to be tested and perform the primality test on the current number to be tested; otherwise, the process is kept on;

Step S4-2, set next identifier as the current identifier and go back to Step S4-1.

Step S3-2 can be replaced with Step S3-2'; correspondingly, Step S4-1 can be replaced with Step S4-1'; Specifically, the Step S3-2' and Step S4-1' include the following:

Step S3-2', compute the identifier numbers to be reset in respective units according to the modulus value.

(1) Dividing the identifier group into a plurality of units and number the identifiers in the units orderly as 0, 1, . . . , if the modulus value is 0, the identifier number to be reset is 0; otherwise, the modulus value is an odd and the number of the identifier to be reset is the obtained by dividing the sum of the current prime number and the modulus value by 2; otherwise, the modulus value is an even and the number of the identifier to be reset is the result obtained by dividing the modulus value by 2.

For example, if the current prime number is 13, the identifier group is divided into 60 units (dividing 768 by 13 to obtain a result and round number of the result and then plus 1), in which 59 units have 13 identifiers respectively and the last unit has 1 identifier; if the modulus value is 5, the number of the identifier to be reset is (13+5)/2=9; if the modulus value is 6, the number of the identifier to be reset is 6/2=3;

(2) if the modulus value is 0, the number of the identifier to be reset is 0 or integer times of the current prime number; otherwise, the modulus value is an odd, the number of the identifier to be reset is the result of dividing sum of the current prime number and the modulus value by 2 or sum of the result and the integer times of the current prime number; otherwise, the modulus value is an even, the number of the identifier to be reset is the result obtained by dividing the modulus value by 2 or sum of the result and integer times of the current prime number;

For example, if the current prime number is 13 and the modulus value is 5, the number of the identifier to be reset is (13+5)/2=9 or sum of 9 and integer times of the current prime number 13; if the modulus value is 6, the number of the identifier to be reset is 6/2=3 or sum of 3 and integer times of the current prime number 13.

Step S4-1', if all of the identifiers are checked completely, the process is ended; otherwise, check whether the current identifier is reset. If yes, calculate difference of the random number and twice of the current identifier number, the difference is a current number to be tested and perform the primality test on the current number to be tested; otherwise, the process is kept on.

EMBODIMENT 2

Figure 2:
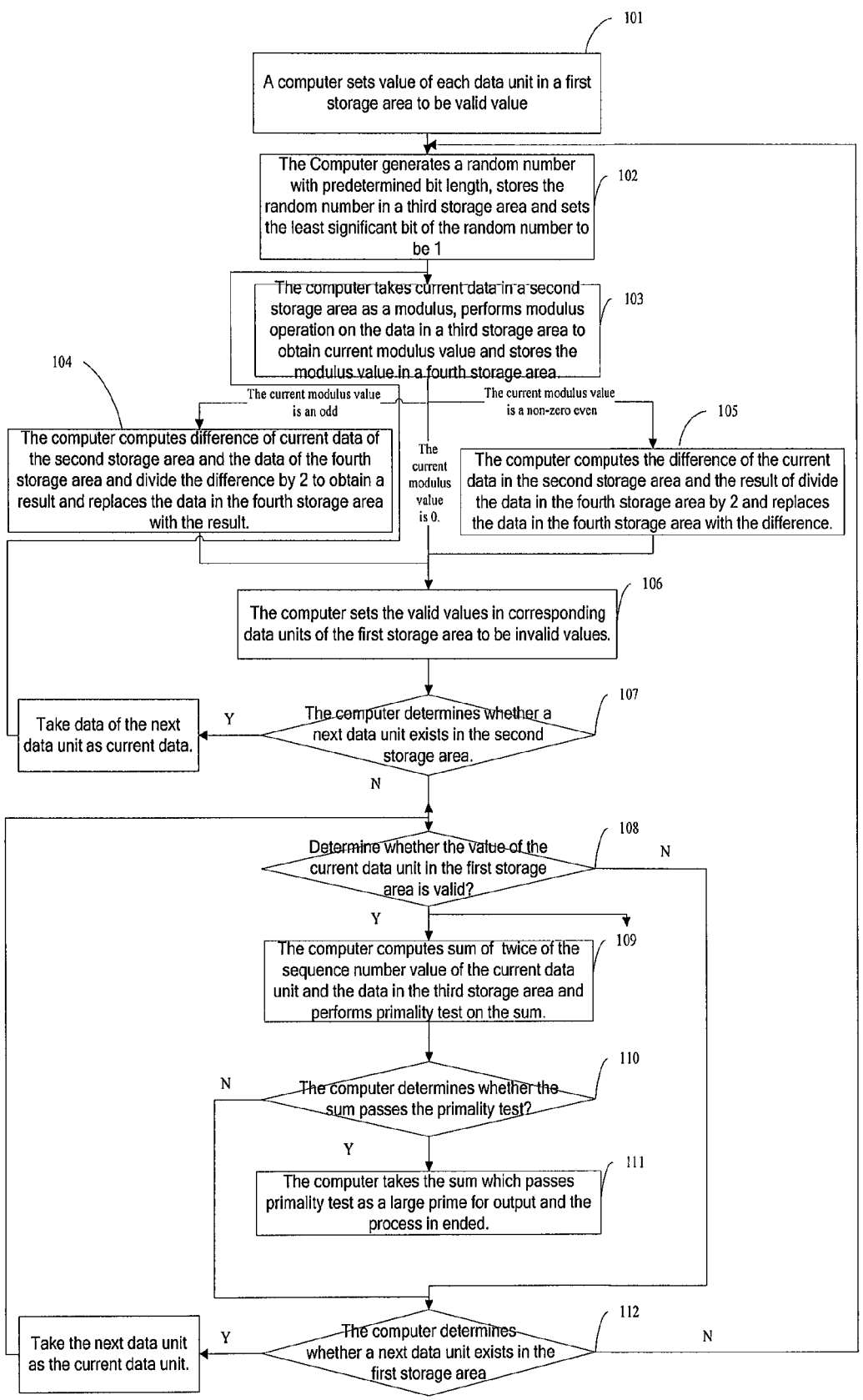
FIG. 2 is a flow chart of a method for generating a large prime number in an embedded system provided by Embodiment 2 of the present invention.

Referring to FIG. 2, in order to improve the probability of the passing the primality test and thus improving the efficiency of generating a large prime number. Embodiment 2 provides a method for generating a large prime number in an embedded system on the basis of Embodiment 1. Specifically, the method includes following steps.

Step 101, a computer sets value of each data unit in a first storage area to be effective value;

Preferably, in Embodiment 2, the size of the first storage area is 768 bits, of which each 1 bit is a data unit, corresponding to 768 random number identifier; specifically, sequence numbers of respective data units are recorded as 0, 1, . . . , 766, 767;

Preferably, in Embodiment 2, the effective value is 1.

Step 102, the computer generates a random number with preset length and stores the random number in a third storage area and sets the least significant bit (or called the last significant bit) of the random number to be 1 if the least significant bit of the random number is not 1;

In Embodiment 2, in order to assure that the generated random number is big enough, both the most significant bit (or called the first significant bit) and the second significant bit are set to be 1; other settings can be set on the random number for the convenient of generation of a prime number; no further detail is given here;

Preferably, in the Embodiment 2, the preset bit length is 64 bit, i.e. a random number with 512 bit and the random number is recorded as p; correspondingly, in Step 101, respective data units can be identifiers of the random numbers p+2*m (m=0, 1, 2, . . . , 766, 767); m is sequence number value of the data unit in the storage space.

Step 103, the computer takes the current data in the second storage area as a modulus and performs modulus operation on data in the third storage area to obtain a current modulo value and stores the current modulo value in a fourth storage area. When the data stored in the fourth storage area is 0, go to Step 106; if the data in the fourth storage area is an odd, go to Step 104; if the data in the fourth storage is a non-zero even, go to Step 105;

Preferably, in Embodiment 2, the second storage area includes all small prime numbers between 3 to 255, each small prime number occupies one storage unit; the storage unit can be a plurality of bits or a plurality of bytes.

Specifically, in Embodiment 2, Step 103 is performed for the first time, the current data is the data in the first storage unit in the second storage area.

Step 104, the computer computes the difference of the current data in the second storage area and the data of the fourth storage area and dividing the difference by 2 to get a result, replaces the data in the fourth storage area with the result and performs Step 106;

Step 105, the computer computes the difference of the current data in the second storage area and the result obtained by dividing the data in the fourth storage area by 2 and replace the data in the fourth storage area with the difference;

Step 106, set the value of the data unit with valid value in the corresponding data unit of the first storage area to be invalid;

Specifically, in Embodiment 2, if the values in the corresponding units are invalid, go to Step 107;

Preferably, in Embodiment 2, corresponding data unit specifically includes the data unit of which the sequence number value is the current modulus value (or called modulized value), the data unit of which the sequence number value is the sum of the current modulus value and the integer times of the current data in the second storage area; the invalid value is 0.

Step 107, the computer determines whether a next data unit exists in the second storage value, if yes, take the data in the next data unit as current data and go back to Step 103; otherwise, go to Step 108;

Step 108, the computer determines whether the value of the current data unit in the first storage area is valid, if yes, go to Step 109; otherwise, go to Step 112;

Specifically, in Embodiment 2, when Step 108 is performed for the first time, the current data unit is the data unit of which the sequence number value is 0 in the first storage area.

Step 109, the computer computes sum of the 2 times of the sequence number value of the current data unit and the data in the third storage area and performs the primality test on the sum;

Step 110, the computer determines whether the sum passes the primality test on the sum, if yes, go to Step 111; otherwise, go to Step 112; p Step 111, the computer outputs the sum as the large prime number and the process is ended;

Step 112, determine whether a next data unit exists in the first storage unit, if yes, take the next data unit as the current data unit and go back Step 108; otherwise, go to Step 102.

In Embodiment 2, Step 101 can be performed at any time before Step 106.

EMBODIMENT 3

Figure 3:
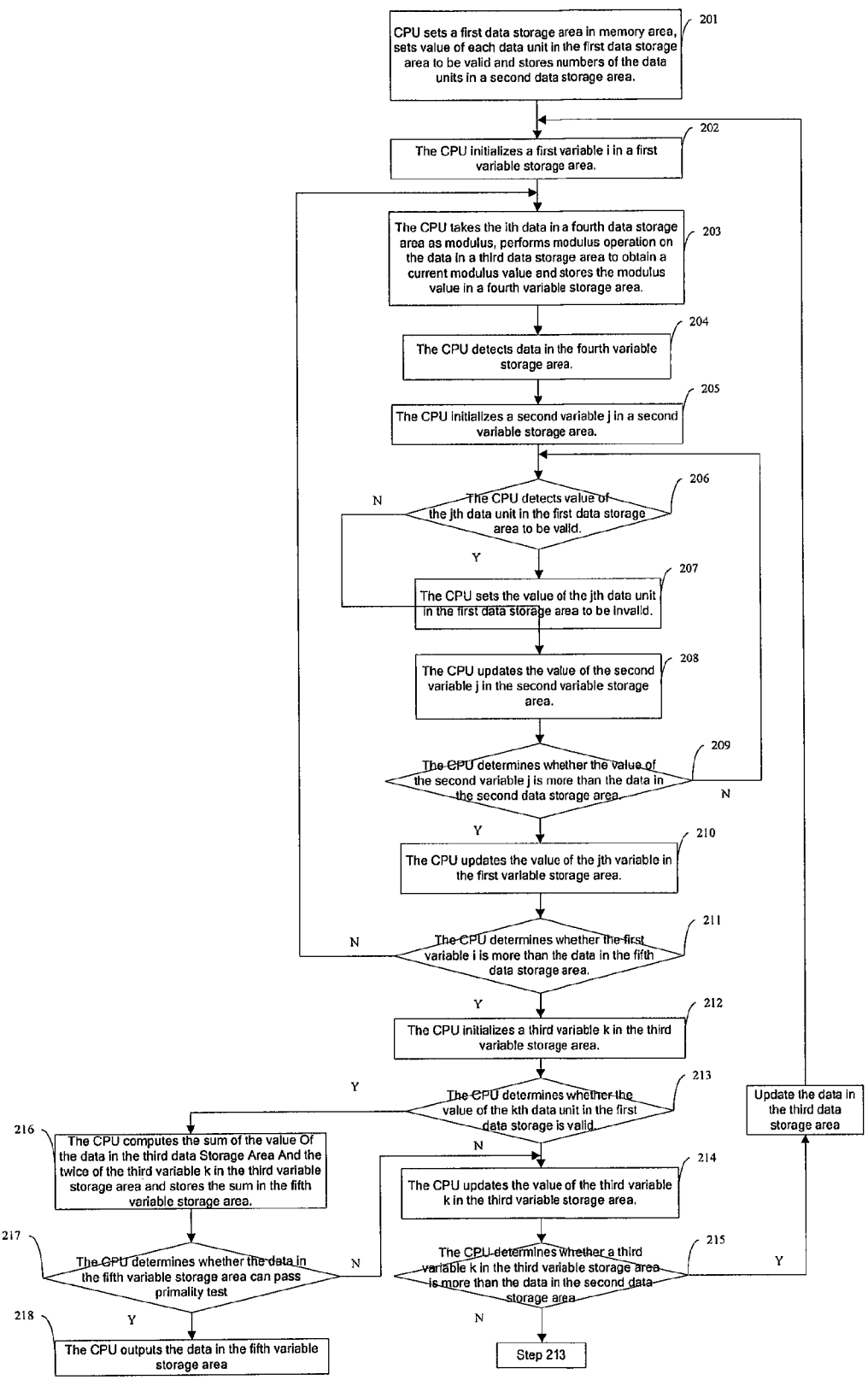
FIG. 3 is a flow chart of method for generating a large prime number by CPU provided by Embodiment 3 of the present invention.

Referring to FIG. 3, Embodiment 3 provides a method for generating a large prime number by a CPU; specifically, the method includes following steps.

Step 201, the CPU sets a first data storage area with preset size in memory area and sets each value of each data unit in the first data storage area to be valid and stores number of the data units in a second data storage area;

in which the data unit can be one bit, or one byte, or a plurality of bits or a plurality of bytes. Preferably, in Embodiment 3, the data unit is one bit; when the value of the data unit is 1, it is regarded as valid; and when the value of the data unit is 0, it is regarded as invalid;

For the convenience of the description, in Embodiment 3, the sequence numbers of respective data units orderly are 0, 1, 2, . . . .

Step 202, the CPU initializes a first variable i in a first variable storage area;

Specifically, in Embodiment 3, the CPU initializes the first variable i to be 1.

Step 203, the CPU takes the ith data in a fourth data storage area as modulus and performs modulus operation on the data in the third data storage area to obtain a current modulus value and stores the current modulus value in a fourth variable storage area;

The third data storage area stores a random number with predetermined bit length generated by a random number generator; preferably, in Embodiment 3, the random number generator generates a random number of 512 bits.

The fourth data storage area stores a group of prime numbers and the number of the prime numbers are stored in the fifth data storage area; preferably, in Embodiment 3, the fourth storage area stores all small prime numbers between 3 to 255;

Step 204, the CPU detects the data in the fourth variable storage area; and

Step 205, the CPU initiates a second variable j in the second variable storage area.

Specifically, in Embodiment 3, when the data in the fourth variable storage area is 0, the CPU initializes the value of the second variable j to be the data of the fourth storage area;

when the data in the fourth variable storage area is an odd, the CPU initializes the second variable j to be a value obtained by dividing the difference of the data in the third variable storage area and the ith data in the fourth data storage area by 2; and when the data in the fourth variable storage area is non-zero even, the CPU initializes the second variable j to be a result obtained by dividing the difference of the ith data in the fourth data storage area and the data in the third variable storage area by 2.

Step 206, the CPU checks whether the value of the jth data unit in the first data storage area is valid, if yes, go to Step 207; otherwise, go to Step 208;

Step 207, the CPU sets the value of the jth data unit in the first data storage area to be invalid;

Step 208, the CPU updates the second variable j in the second variable storage area;

Specifically, in Embodiment 3, updating the second variable j in the second variable storage area specifically includes updating the value of the second variable j to be the sum of the second variable value j and the ith data in the fourth data storage area.

Step 209, the CPU determines whether the value of the second variable j in the second variable storage area is more than the data in the second data storage area, if yes, go to Step 210; otherwise, go back to Step 206;

Step 210, the CPU updates the value of the first variable i in the first variable storage area;

Specifically, in Embodiment 3, updating the first variable i in the first variable storage area specifically includes updating the value of the first variable i to be the value of the first variable i and then plus 1.

Step 211, the CPU determines whether the value of the first variable i in the first variable storage area is more than the data in the fifth data storage area, if yes, go to Step 212; otherwise, go back to Step 203;

Step 212, the CPU initializes the third variable k in the third variable storage area;

Specifically, in Embodiment 3, the CPU initializes the third variable k to be 0.

Step 213, the CPU determines whether the value of the kth data unit in the first data storage area is valid, if yes, go to Step 216; otherwise, go to Step 214;

Step 214, the CPU updates the value of the third variable k in the third variable storage area;

Specifically, in Embodiment 3, updating the third variable k in the third variable storage area includes updating the value of the third variable k to be the value of result of the third variable k plus 1.

Step 215, the CPU determines whether the value of the third variable k in the third variable storage area is more than the data in the second data storage area, if yes, update the data in the third data storage area and go back to the Step 202; otherwise, go back to Step 213;

Step 216, the CPU computes the sum of the data in the third data storage area and twice of the third variable k in the third variable storage area and stores the sum in a fifth variable storage area;

Step 217, the CPU determines whether the data in the fifth variable storage area can pass the primality test, if yes, go to Step 218; otherwise, go back to Step 214;

Step 218, the CPU outputs the data in the fifth variable storage area.

Steps in the description of the embodiment disclosed by the present invention can be implemented by hardware, or software module executed by a processor or combination of both of the hardware and the software module. The software module can be set in RAM, memory, ROM, electrically programmable ROM, EEPROM (electrically erasable programmable read-only memory), register, hardware, mobile hardware, removable disk, CD-ROM or any storage media in any other form in the prior art.

Above description is only to illustrate the preferred embodiments but not to limit the present invention. Any modification and equivalent substitute made by those skilled in the art in the scope of the technical solution of the present disclosure should fall into the protection scope of the present disclosure. The scope of protection is defined in claims of the present invention.

The invention claimed is:

1. An encryption process, the encryption process uses a large prime number as a key parameter, the large prime number is generated in an embedded system, the embedded system comprising a first storage area and a second storage area, wherein the first storage area stores an identifier group with a predetermined size, sequence numbers of the identifiers in the identifier group are consecutive integers including 0, and different identifiers have different sequence numbers, and the second storage area comprises a plurality of storage units, and the different storage units store different prime numbers, the method of generating the large prime number in the embedded system comprising steps of:
1) resetting all identifiers in the identifier group stored in the first storage area;
using a random number generator to generate a random number with a predetermined bit length, and storing the random number in a third storage area, taking the data of the storage unit in the second storage area as modulus to perform modulus operation on the data stored in the third storage area to obtain a modulus value; according to the modulus value and the data stored in the storage unit corresponding to the modulus value, determining a sequence number of the identifier which requires to be reset in the identifier group, and resetting the identifier corresponding to the sequence number;
2) determining whether a reset identifier exists in the identifier group, if yes, go to Step 3); if no, go back to Step 1);
3) determining a number to be tested according to the random number and the sequence number of the reset identifier in the identifier group, and performing a primality test on the number to be tested; if the number to be tested passes the primality test, outputting the number to be tested as a large prime number; while if numbers to be tested corresponding to all the reset identifiers in the identifier group do not pass the primality test, go back to Step 1); and
using the large prime number in the encryption process.

2. The process of claim 1, wherein, according to the modulus value and the data stored in the storage unit corresponding to the modulus value, determining the sequence number of the identifier which requires to be reset in the identifier group specifically comprises when the modulus value is 0, taking a sum of the modulus value and integer times of data stored in the storage unit corresponding to the modulus value as the sequence number of the identifier to be reset;

when the modulus value is an odd, obtaining difference of the data stored in the storage unit corresponding to the modulus value and the modulus value, obtaining a result by dividing the difference by 2 and taking the result as the sequence number of the identifier to be reset; and when the modulus value is a non-zero even, obtaining a quotient by dividing the current modulus value by 2, and taking the difference of the current prime number and the quotient as the sequence number of the identifier to be reset; and determining a number to be tested according to the random number and the sequence number of the reset identifier in the identifier group specifically comprises taking a result of a sum of twice of the sequence number of the reset identifier and the random number as the number to be tested.

3. The process of claim 1, wherein according to the modulus value and the data stored in the storage unit corresponding to the modulus value, determining the sequence number of the identifier which requires to be reset in the identifier group specifically comprises when the modulus value is 0, taking a sum of the modulus value and integer times of the data stored in the storage unit corresponding to the modulus value as the sequence number of the identifier which requires to be reset;

when the modulus value is an odd, obtaining a sum of the data stored in the storage unit corresponding to the modulus value and the modulus value, obtaining a quotient by dividing the difference by 2, and taking the quotient as the sequence number of the identifier to be reset; and when the modulus value is a non-zero even, taking a quotient of dividing the modulus value by 2 as the sequence number of the identifier which requires to be reset; and determining a number to be tested according to the random number and the sequence number of the reset identifier in the identifier group specifically comprises taking difference of the random number and twice of the sequence number of the identifier to be reset as the number to be tested.

4. The process of claim 1, wherein generating the random number with a predetermined bit length comprises generating a binary number with the predetermined bit length;

determining whether the least significant bit of the binary number is 1, if the least significant bit of the binary number is 1, taking the binary number as the random number; while if the least significant bit of the binary number is not 1, setting the least significant bit of the binary number to be 1 and taking the binary number as the random number.

5. The process of claim 1, wherein generating the random number with a predetermined bit length comprises generating a binary number with the predetermined bit length;

determining whether the first significant bit of the binary number is 1, if the first significant bit of the binary number is 1, taking the binary number as the random number; while if the most significant bit of the binary number is not 1, setting the most significant bit of the binary number to be 1 and taking the binary number as the random number.

* * * * *